Patented July 12, 1938

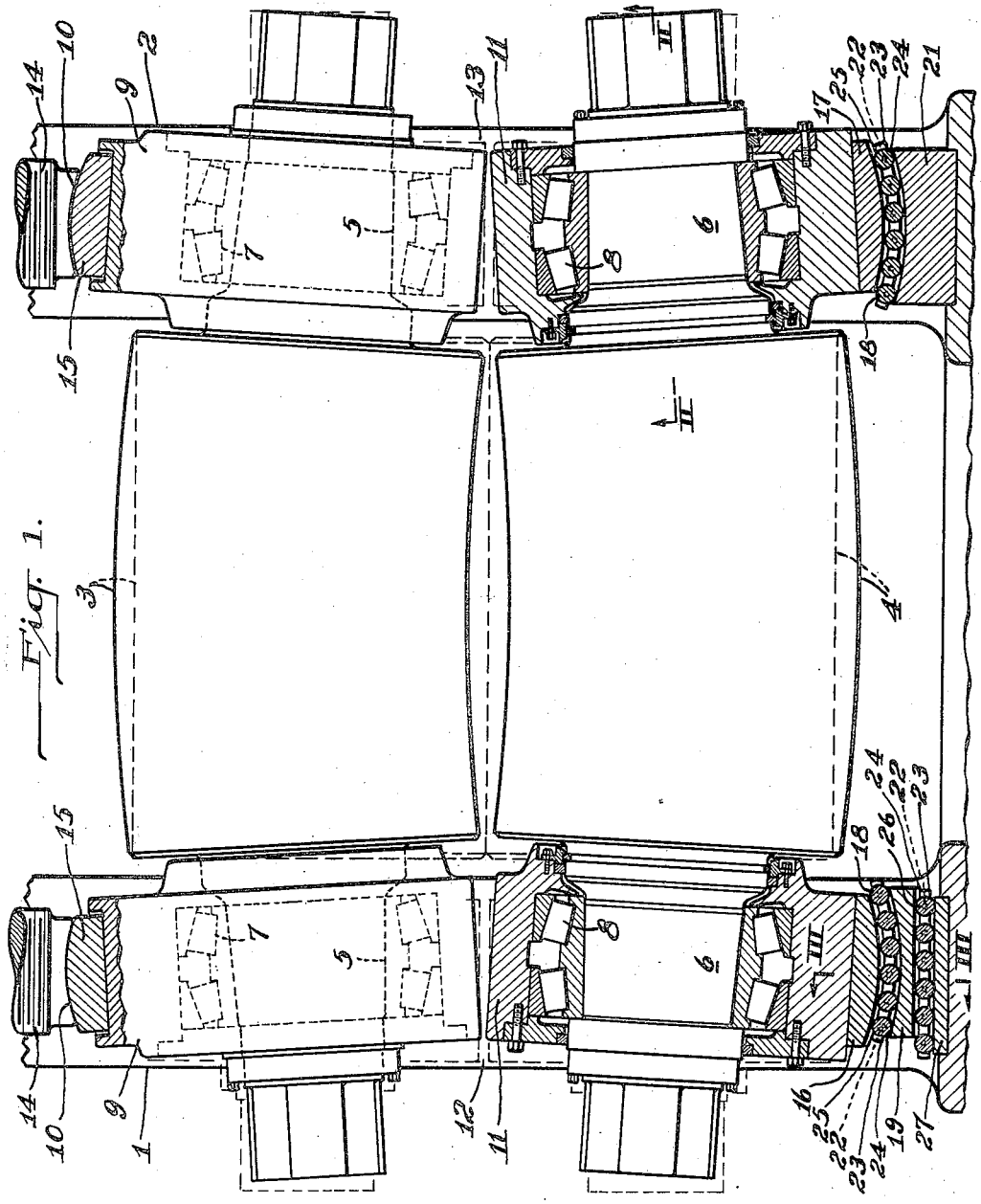

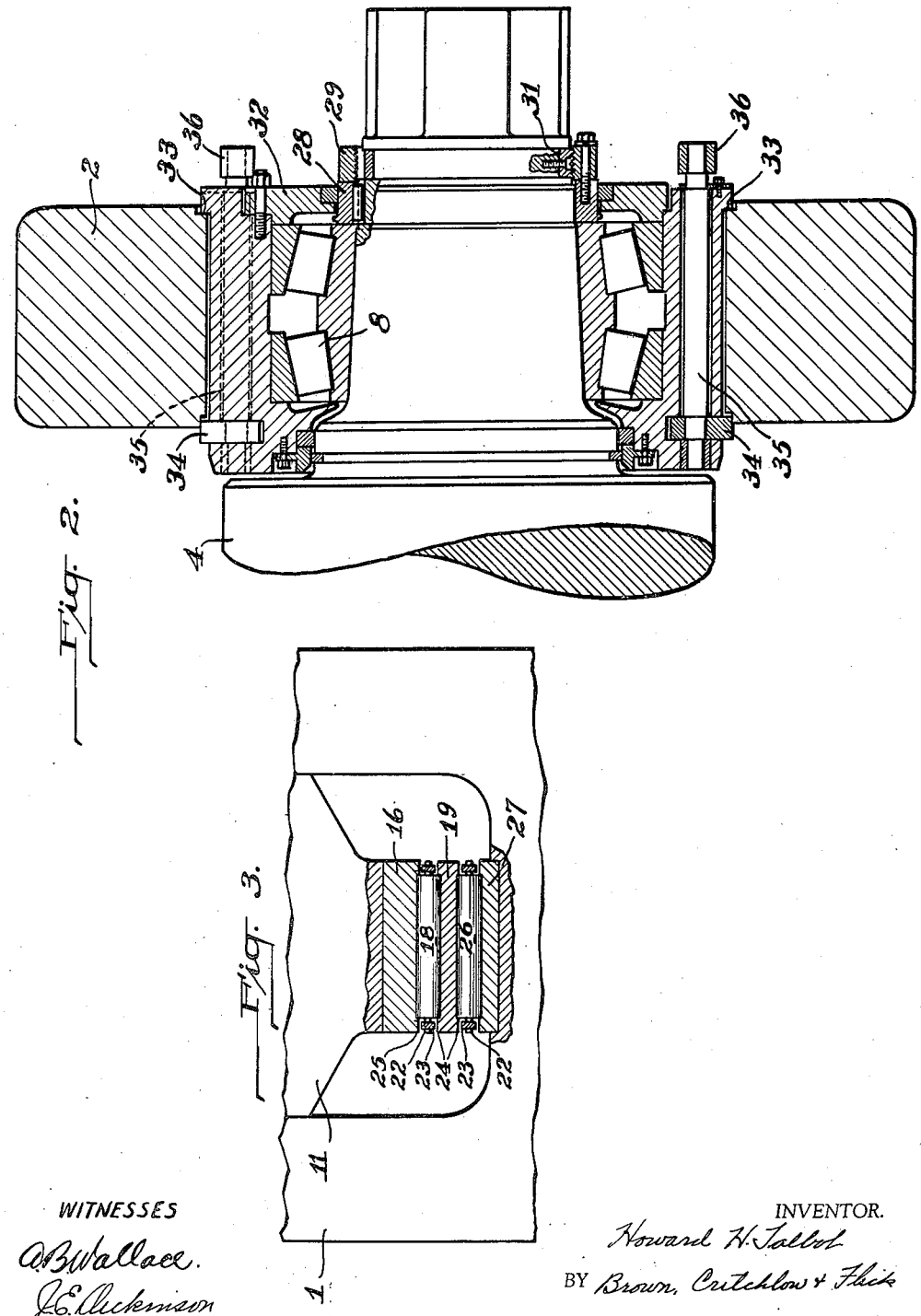

2,123,754

UNITED STATES PATENT OFFICE 2,123,754

DEFLECTION COMPENSATING ROLL BEARING ASSEMBLY

Howard H. Talbot, Pittsburgh, Pa., assignor to United Engineering & Foundry Company, Pittsburgh, Pa., a corporation of Pennsylvania Application May 16, 1935, Serial No. 21,766

5 Claims. (Cl. 80—55)

This invention relates to rolling mills, and, more particularly, to an improvement in the construction and mounting of the bearing chucks in which the necks of the working rolls are supported.

In rolling mills of the horizontal type when a piece of metal is passed through the cooperating parallel rolls the pressure developed causes the rolls to be deflected apart at their centers, and their ends to be inclined with respect to each other. In the customary mill this canting of the roll necks results in their supporting bearings being unevenly worn at their ends and, where roller bearings are employed, it frequently causes them to bind and thereby reduces their anti-friction qualities and in some instances fractures the rollers.

With these conditions in mind, it is an object of this invention to provide a bearing construction, and mounting therefor, for use on the rolls of a rolling mill which permits the bearings to maintain their parallelism with the roll necks when the rolls are deflected away from their normal axes and eliminates binding and uneven wear in the bearings.

Another object is to provide a bearing mounting of this character which also permits such axial displacement of the bearings as may be necessary to compensate for the change in spacing of the bearings occasioned by the deflection of the rolls, and also expansion and contraction caused by variations in temperature.

A further object is to provide a mounting of this character which is sufficiently sturdy and has a sufficient bearing surface to adequately withstand at all times the rolling strains encountered.

These and other objects, as well as the various other novel features and advantages of the invention, will be apparent when the following detailed description is read in conjunction with the accompanying drawings, of which Fig. 1 is a vertical section taken through the center of a rolling mill constructed in accordance with the invention and showing, for the purpose of clearness, the deflection of the rolls greatly exaggerated; Fig. 2 a sectional view taken on the line II—II of Fig. 1; and Fig. 3 a sectional view taken on the line III—III of Fig. 1.

Referring in detail to the embodiment of the invention illustrated in the drawings, the numerals 1 and 2 designate the roll housing of a conventional mill, and the numerals 3 and 4 the upper and lower rolls thereof respectively. The necks 5 and 6 of these rolls are equipped in a known manner with roller bearings 7 and 8 and the latter supported in completely encircling bearing chucks 9 and 11 respectively.

The upper of these chucks are mounted in the usual way for vertical adjustment in the windows 12 and 13 of the roll housings, and, to effect their adjustment, to thereby adjust the upper roll 3 with respect to the lower roll 4 and, consequently, regulate the working pass of the mill, the customary screws 14 are provided in the tops of the roll housings 1 and 2. These screws 14, as shown, are provided with concave ends which seat on rounded surfaces 10 forming the tops of pressure blocks 15 mounted at the tops of the upper roll chucks 9. With such an arrangement the chucks 9 are allowed to follow the roll necks 5, as indicated in the drawings, when the upper roll is deflected by the passage of the metal between the rolls. This engagement between the screws 14 and the pressure blocks 15 also permits axial movement of at least one of the upper chucks to take care of the change in distance between the chucks when the upper roll is deflected, or the roll is expanded or contracted by temperature changes. In this instance, however, the chuck located in the housing 1 is the only one which is allowed to move laterally with respect to the associated screws 14 as will presently appear.

To permit the lower chucks 11 to also follow the necks thereof when the lower roll is deflected and thereby eliminate binding and uneven wear in the bearing surfaces of the latter, pivot blocks 16 and 17, having convex lower surfaces, are mounted on the under sides of the lower chucks, with their lower convex surfaces resting upon a plurality of rollers 18 supported in concave bearing seats 19 and 21 which are supported in the bases of the housing windows 12 and 13. These pivot blocks are provided with flat upper surfaces which contact the roll chucks, and the axes of curvature of their convex surfaces which have the axis of the roll as their center, are disposed at right angles to the roll axis as are the axes of curvature of the supporting seats 19 and 21. Thus, the lower chucks 11 are permitted to maintain their parallelism with the necks 6 of the lower roll 4 whenever the latter is deflected.

To maintain the rollers 18 properly spaced from each other so that they will operate properly they are equipped with trunnions 22 and these engaged in suitable retainers 23 provided at the two ends of such rollers. To also prevent axial displacement of these rollers, the pivot blocks 16 and the bearing seats 19 and 21 are provided with shoulders 24 and 25 at their ends which engage the ends of the rollers.

In order that at least one of the lower chucks 11 may be displaced laterally to compensate for the change in distance between them by the deflection of the lower roll, one of the bearing seats, and, in this instance the seat 19 disposed in the housing 1, is provided with a flat under surface and this disposed to move on a series of transverse rollers 26 that are in turn mounted on a platen 27 secured in the base of the housing 1. The other bearing seat 21 is made in one solid piece and secured, like the platen 27, in the base of the housing 2. With such an arrangement it is obvious that the bearing chucks at only one end of the mill are permitted to move axially with respect to the rolls. However, only the chucks at one end of the rolls need to be so moved to take care of the conditions referred to and, in accordance with a common practice, these chucks are adapted to slide freely in the window of the housing 1 in which they are located.

In the construction illustrated the roller bearings are locked against axial movement on the necks of the rolls by locking rings 28 and 29 secured in grooves 31 in the roll necks, and the chucks likewise held against such movement by the use of end plates 32 which are bolted to the chucks and engaged with the roller bearings. To hold the rolls in their proper positions between the housings, the chucks in the housing 2 are provided at one end with shoulders 33 which engage the outer face of the housing 2 and carry pivoted latches 34, which may be moved into and out of engagement with the inner face of the housing 2, to anchor such chucks in this housing 2 while at the same time permitting them to be readily removed when desired. For operating these latches they are secured to a pair of rods 35 which are projected beyond the outer face of the chucks and equipped with suitable manipulating handles 36.

As will be readily appreciated by those skilled in the art, the advantages of this invention reside in the provision of practical and feasible means for permitting the bearings mounted on the necks of the rolls of a rolling mill to at all times maintain themselves in accurate parallelism with the necks of the rolls and thereby eliminate any binding therein or uneven wear. In addition, it also eliminates any distortion in the roll housing and chucks by reason of changes in the distances between the chucks due to the deflection of the rolls when metal is passed between them.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a rolling mill, a lower roll neck supporting bearing, a pivot block having a flat upper surface disposed to engage the bottom of said bearing and a convex lower surface, a seat for said pivot block having a concave upper surface and a flat lower surface, a series of rollers arranged between said pivot block and said seat, and a series of rollers below said seat.

2. In a rolling mill, a roll housing, a lower roll neck supporting bearing mounted in a window of said housing, a pivot block having a lower convex surface mounted with its upper surface engaging the bottom of said bearing, a seat having a flat lower surface and a concave upper surface arranged to receive said pivot block, a flat top wear member disposed below said seat in said window, a series of rollers arranged between said seat and said pivot block, and a series of rollers mounted on said wear member to engage said seat.

3. In a rolling mill, a pair of spaced roll housings, a pair of lower roll neck supporting bearings mounted in windows in said housings, a pivot block having a convex lower surface mounted in said windows with the upper surface thereof engaging the bottoms of said neck bearings, a seat having a concave upper surface for receiving one of said pivot blocks mounted against movement in one of said windows, and a seat having a concave upper surface and a flat lower surface mounted in the other of said windows with its upper surface disposed to receive the associated pivot and its lower surface mounted for movement on a wear member arranged in the bottom of the window.

4. A construction according to claim 3 in which rollers are arranged between said seats and said pivot blocks and between the movable seat and its support.

5. In a rolling mill, a roll housing, a lower roll neck supporting bearing mounted in a window of said housing, a block having a lower convex surface mounted with its upper surface engaging the bottom of said bearing, a seat having a flat lower surface and a concave upper surface, a flat top wear member disposed below said seat in said window, a series of rollers arranged between said seat and said pivot block, a series of rollers between said seat and said wear member, cooperating shoulders on said pivot block, said seat and said wear plate for preventing endwise displacement of said rollers, and means for preventing relative lateral displacement of the rollers in said two different series of rollers.

HOWARD H. TALBOT.